(12) United States Patent
Jensen

(10) Patent No.: US 6,622,161 B1
(45) Date of Patent: Sep. 16, 2003

(54) INFORMATION TRANSFER APPLICATIONS

(75) Inventor: Philip Jensen, Lower Hutt (NZ)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/431,900

(22) Filed: Nov. 2, 1999

(51) Int. Cl.$^7$ .............................................. G06F 13/00
(52) U.S. Cl. ........................ 709/206; 709/217; 709/232
(58) Field of Search ................................ 709/206, 217, 709/218, 219, 230, 232

(56) References Cited

U.S. PATENT DOCUMENTS

| | | | | |
|---|---|---|---|---|
| 5,506,872 A | * | 4/1996 | Mohler ........................ | 375/240 |
| 5,737,540 A | * | 4/1998 | Ogawa ........................ | 710/300 |
| 5,933,478 A | * | 8/1999 | Ozaki et al. ................ | 340/7.29 |
| 6,141,324 A | * | 10/2000 | Abbott et al. ................ | 370/236 |
| 6,189,027 B1 | * | 2/2001 | Haneda et al. .............. | 709/105 |
| 6,311,210 B1 | * | 10/2001 | Foladare et al. ............ | 709/206 |
| 6,381,458 B1 | * | 4/2002 | Frodigh et al. .............. | 455/442 |
| 6,393,463 B1 | * | 5/2002 | Fuchigami ................... | 709/206 |

* cited by examiner

Primary Examiner—David Wiley
Assistant Examiner—April L Baugh
(74) Attorney, Agent, or Firm—Khanh Q. Tran

(57) ABSTRACT

The present invention relates to a means, system and method for controlling the storage space required by a storage means which contains information items associated with an information transfer application. The information transfer application is typically an email application 10 which allows a user to send or receive information items such as electronic mail, electronic documents, electronic files and the like, and stores the items in a mail database or mail file 23 which utilises the storage means. The application 10 includes a transfer control means 20 which is activated whenever a user attempts to access a received item 50 or create a new item 32 for sending. Once activated, the transfer control means 20 compares 35 the storage space required by the storage means to store the items contained in the database 23 with a first set level and prevents further transmission of information items if the required storage space exceeds 37 a first set level. The transfer control means 20 notifies 38, 52 the user when the storage space required exceeds 37 the first set level. The transfer control means 20 may also notify 42 the user when the storage space required exceeds 41 a second set level which is lower than the first set level, to provide the user with warning that the storage space required is approaching the first set level.

16 Claims, 6 Drawing Sheets

INFORMATION TRANSFER APPLICATIONS

FIELD OF THE INVENTION

This invention relates to information transfer applications which can be implemented on each of a plurality of computer systems, and which enable electronic transfer of information items between the computer systems. In particular it relates to information transfer applications which store received or transmitted items in a storage means, and which also include means for controlling the transfer of information. By controlling the transfer of information, the quantity of storage space used by the storage means for storing items can be controlled. A typical information transfer application may be, but is not restricted to, an electronic mail application which enables the transfer of electronic mail, electronic documents, electronic files or the like, between computer systems. Lotus Notes is an example of an electronic application which can include a means for controlling the transfer of information.

BACKGROUND TO THE INVENTION

A user of a computer system which is connected to one or more other computer systems may electronically send and receive information items to/from the other computer systems. This provides a means of communicating with users of the other computer systems. The computer systems may be connected via one or more networks, for example a Local Area Network or the Internet. The information items may be electronic mail, electronic documents, electronic files or the like.

To send and receive information, a computer which forms part of a network uses an information transfer application, for example an electronic mail application, which provides the computer user with the ability to create and send information items, and to access information items received from other computer systems.

When an information item, for example an electronic mail, is sent from a computer system, the item is stored in an 'outbox' associated with the application. Similarly when a computer system receives an information item the item is stored in an 'inbox'. The combination of the outbox and inbox form a database, and in the case of an electronic mail application, is called a mail database or mail file. The information items in the database are stored in a storage means associated with the computer which sends and receives the information. The storage means is typically computer memory or disk space which forms part of a mail server associated with the computer. Alternatively the storage means may form part of the actual computer which is associated with the particular database.

Once a large number of information items have been sent and/or received by a particular computer, the database associated with the application becomes large and, therefore, so does the quantity of memory required to store the information items. The quantity of information the storage means can hold is limited and therefore information can no longer be stored once the limit is exceeded. When this situation occurs it is necessary to delete at least some of the information items contained in the database.

There exist systems which provide notification when the quantity of information contained in the storage means is too large. One such system alerts a mail server administrator that the storage means associated with a particular database is becoming full. However, generally deletion of the items has to be performed by the user of the particular database. Many of the items contained in the database can be of importance and only the user can determine which items should be kept and which should be deleted. Therefore in this situation the administrator is not in a position to perform deletions, but can merely instruct a certain user or users to delete items from their respective database/s. There is no guarantee that the users will actually adhere to such instructions.

In another system the user responsible for a particular database is notified directly when the associated storage means becomes full. Again there is no guarantee that the user will actually delete any items.

In yet another system, when the quantity of information in a particular storage means reaches a predetermined level, no more received electronic items will be stored. This has the disadvantage that a particular user will no longer have access to any items sent to them, until at least some items have been deleted from the storage means.

Thus there is a need for a information transfer application which entices the user of a particular mail database to delete electronic items from the database when the storage means associated with the database become full.

SUMMARY OF THE INVENTION

The object of the present invention is to provide a transfer control means to prevent a user of an information transfer application from electronically transmitting information items when a database associated with the application has reached a predetermined limit on storage space.

An existing application may be modified to incorporate, or work with, the transfer control means. Alternatively the transfer control means may form part of, or work with a newly developed application.

In one aspect the invention may be said to broadly consist in an information transfer application for enabling a user to electronically transmit items to, and electronically receive items from, a plurality of destinations. The application stores the items which have been transmitted or received in a storage means. The application also includes a transfer control means which monitors the storage space required to store the items. If the storage space required exceeds a first set level, then the transfer control means at least partially disables the application to prevent the user from initiating further transmission of items to one or more of the destinations.

In a further aspect the invention may be said to broadly consist in a system for electronically transmitting items to, and electronically receiving items from, a plurality of destinations. The system includes an information transfer application which includes a transfer control means. The system also includes a storage means. The application stores the received or transmitted items in the storage means and the control means monitors the storage space required to store the items. If the storage space required exceeds a first set level then the control means at least partially disables the application to prevent the user from initiating further transmission of items to one or more of the destinations.

In another aspect the invention may be said to broadly consist in a method for controlling an information transfer application which can transmit and receive items, the items being stored in a storage means. According to the method, when a request is received by the application to initiate transmission of a new item using the application then the storage space required for storing the previously received or transmitted items is determined. The required storage space is then compared with a first set level. If the required storage space exceeds the first set level then at least part of the application is disabled to prevent initiation of item transmission.

BRIEF DESCRIPTION OF THE DRAWINGS

Preferred embodiments of the invention will be described with reference to the drawings of which.

DETAILED DESCRIPTION OF THE PREFERRED EMBODIMENTS

The preferred embodiment of the present invention relates to a transfer control means incorporated with an electronic mail application known in the art, for example Lotus Notes or Microsoft Exchange. However it will be appreciated that the invention could be implemented with respect to any information transfer software or application which provides the ability to electronically transfer information items to one or more destinations, and which records the transferred information in a storage means.

Figure 1:
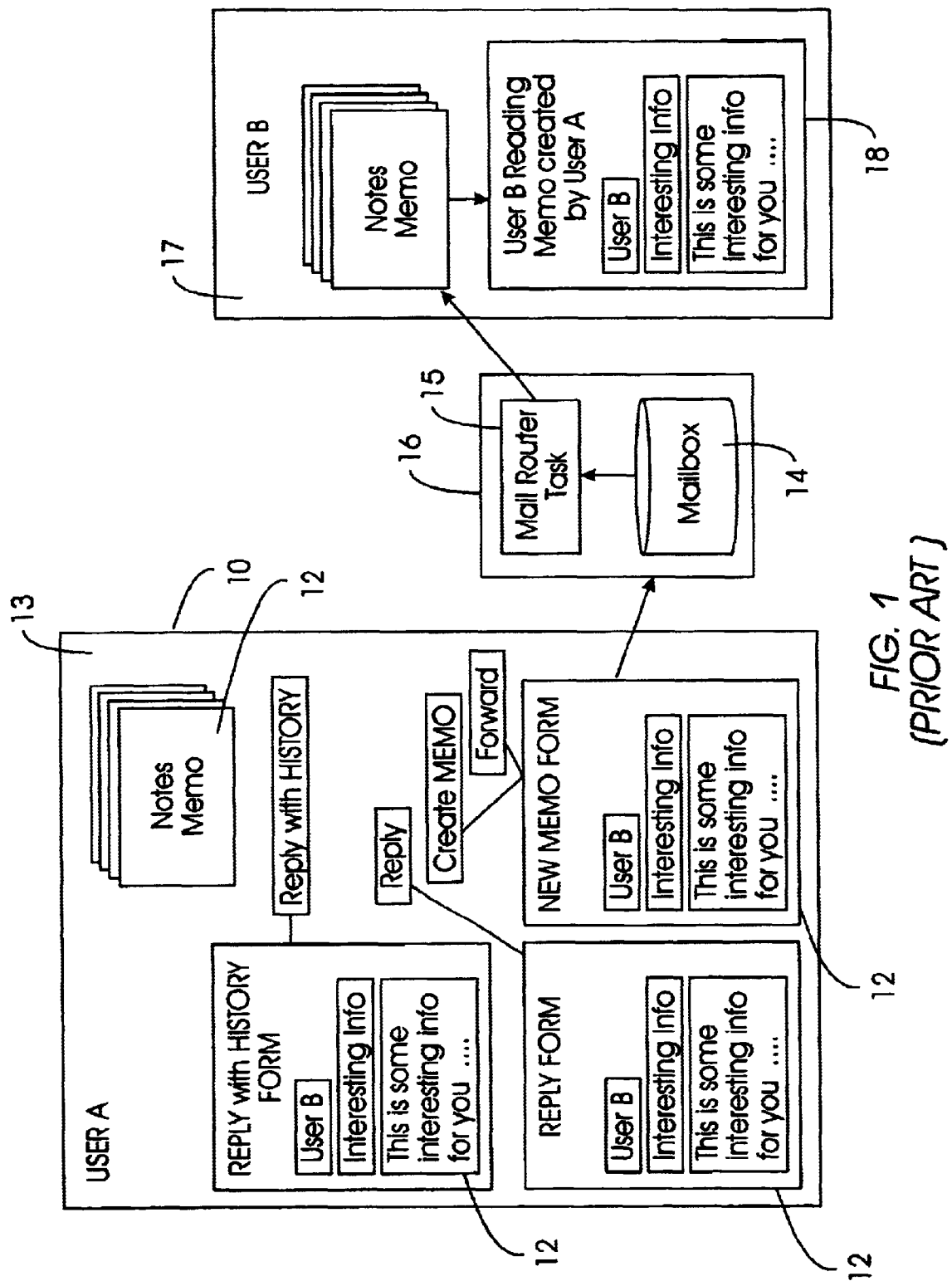
FIG. 1 shows an overview of an existing electronic mail application.

FIG. 1 shows an overview of an existing information transfer application 10, for example Lotus Notes, implemented on a computer system. User A creates an electronic mail item or memo using a memo template 12 stored in User A's mail database or mail file 13. In Lotus Notes the memo template 12 may be for creating a new memo, a memo for replying to a previously received memo, or a memo for replying with history to a previously received memo. A memo is created by activating an item creation means. Preferably this is achieved by clicking on an appropriate icon, which opens the appropriate memo template, allowing the user to input information into the memo template. The information may for example be a text message and/or an image. Computer files, documents or the like may also be attached to the memo. When a memo, for example a new memo, is completed the memo can then be sent to the destination of the recipient by activating an item transmission means. Preferably this will be done by clicking with a mouse the "send memo" icon of the application. Once activated the item transmission means sends the memo item to a server mailbox 14. A mail router 15 running on the server 16, polls the server mailbox 14 for new memo items. When a new item exists in the mailbox 14, the mail router 15 transfers the item into a destination mail file 17. The destination mail file is associated with the specified recipient of the item, which in this case is User B. User B can then access the item using the memo template 18 stored in User B's mail file 17.

Figure 2:
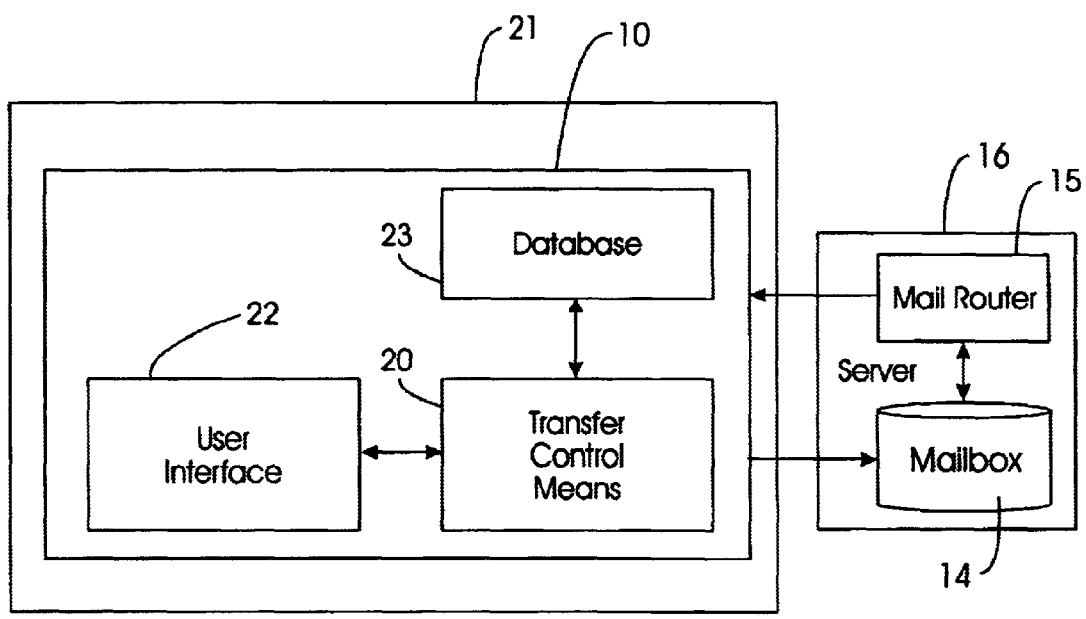
FIG. 2 shows an overview of an existing electronic mail application and transfer control means according to the present invention.

FIG. 2 shows an overview of a preferred embodiment of the present invention. The transfer control means 20 is incorporated with an existing electronic mail application 10 which is running on a computer system 21, for example the application 10 outlined in FIG. 1. The control means 20 is activated whenever the user, by way of a user interface 22, attempts to initiate the transmission of an information item. Preferably this occurs when the user attempts to create or prepare an information item for sending. The control means 20 may also be activated when a user, by way of the user interface 22, attempts to access a received information item. The transfer control means 20 preferably includes code which the application executes when a user attempts one of the abovementioned operations. Once activated the control means 20 checks the amount of storage space required by the items in the database 23 and prevents the user creating items or sending further items to the server mailbox 14 if the database 23 requires too much storage space. This is done by at least partially disabling the application, and in the preferred embodiment this is achieved by disabling the item creation means. It will be understood by those skilled in the art that the control means could be activated at some other suitable time which will prevent an information item being sent. For instance if a user tries to send, a computer file or document which has already been created, then the transfer control means will be activated when the user activates the item transmission means, the control means will check if the database size is too large, and if so, will disable the item transmission means to prevent the file or document being sent.

The operation of the invention will now be described in detail with reference to FIGS. 3–6.

Figure 3:
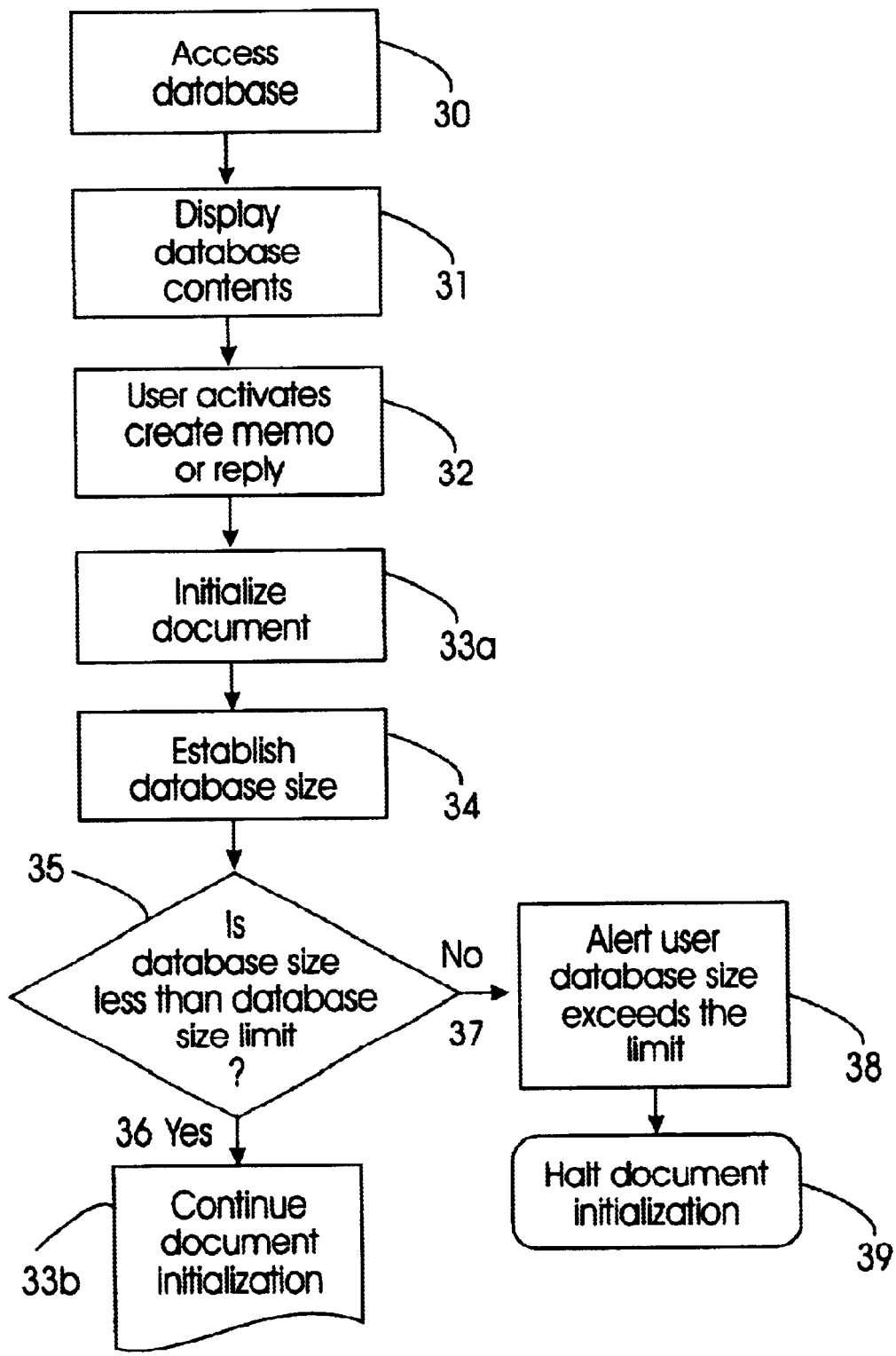
FIG. 3 is a flow diagram outlining the function of the electronic mail application and transfer control means when a user attempts to create or send an item.

FIG. 3 shows a preferred operation of an application which incorporates a transfer control means when a user tries to create a new item for subsequent sending, or tries to reply to a item which has been received. The user first accesses the database 30, the contents of which are then displayed 31 by the user interface 22. In relation to Lotus Notes this involves the application opening the mail file and processing the scripts contained in the OpenDatabase event. Lotus Notes then displays 31 the items contained in the database based on the database properties. The user then activates the item creation means, in this case the create or reply function of the application 32, preferably by way of the user interface 22. The application begins to initialise a document 33a. In the preferred embodiment the application then activates the transfer control means 20. The control means 20 first checks 34 the size of the database to determine how much storage space is required to store the items contained in the database. Preferably this involves establishing how many bytes of storage space are required to store the information items, however any other suitable indicator of size, for example the number of items contained in the database, may be used.

The control means 20 then performs a comparison 35 of the database size with a first size limit or a database size limit. If the database size is less 36 than the database size limit, the application continues the document initialization 33b and allows the user to create the new item for sending, or to reply to a received item. Preferably, the database size limit is contained within the transfer control means 20 code, and is set to the required level by a mail system administrator.

If the database size is greater 37 than the database size limit, then the transfer control means 20 alerts the user 38 by way of a pop up box on the computer screen that the database size is over the limit. The control means 20 preferably also advises the user that they should delete some of the items contained in their database to enable normal operation of the application 10. It will also be appreciated that it is not a requirement that the user is alerted or, alternatively, that the user could be alerted by some other appropriate means. The transfer control means 20 then disables or halts the initialization process 39 which prevents the application from allowing the user to create new items, reply to received item, or send already created items.

Figure 4:
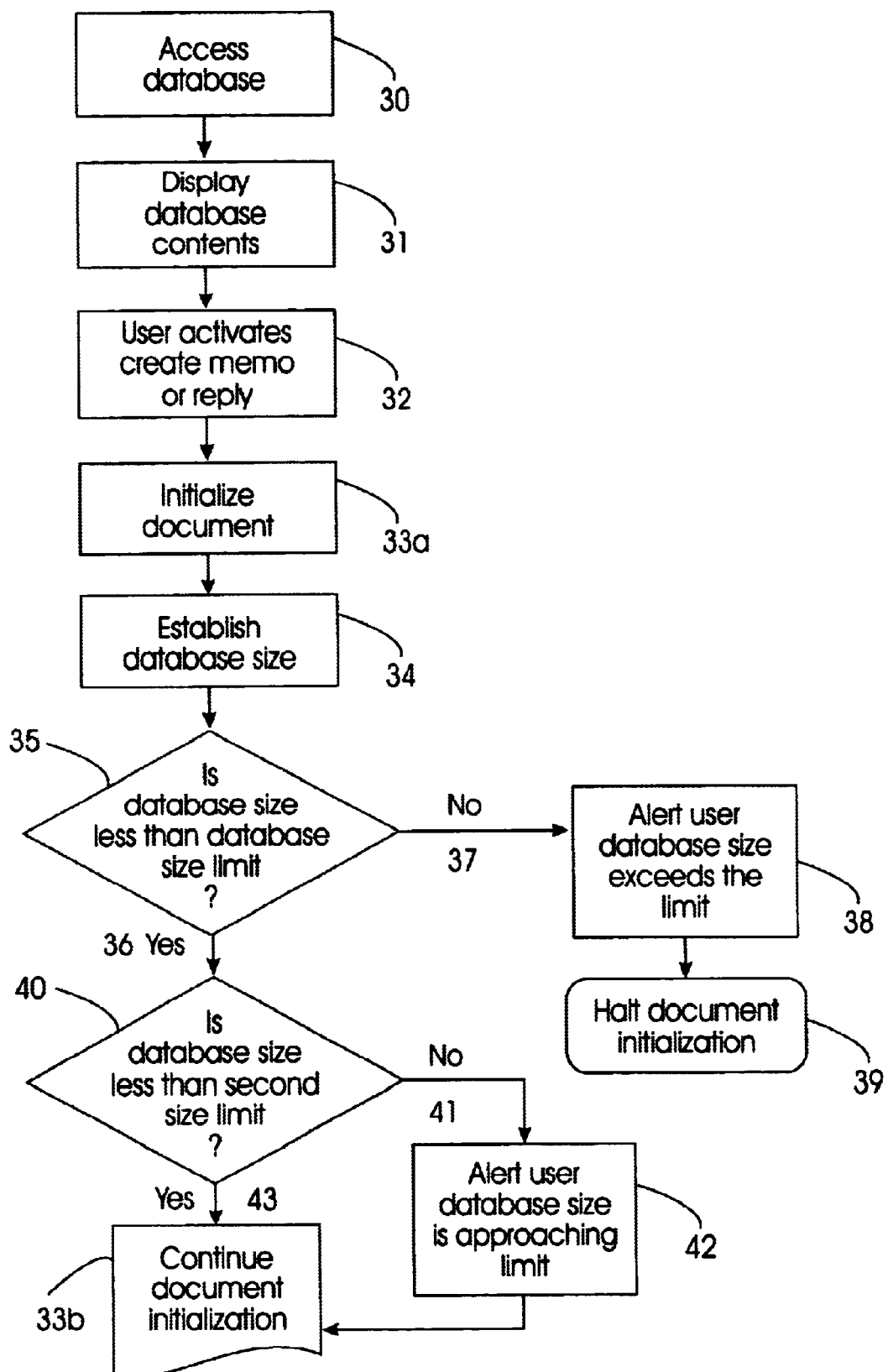
FIG. 4 is a flow diagram outlining the function of the electronic mail application and transfer control means when a user attempts to create or send an item, further including a database size warning means.

FIG. 4 shows a further embodiment, in which the transfer control means also compares 40 the database size with a second size limit which is smaller than the database size limit. The difference between the two limits is the size leeway. The purpose of this comparison is to provide the user with some prior warning when the database size is approaching the database size limit. When the database size exceeds the second size limit 41 the user is alerted 42 that the database size is approaching the limit. However after alerting the user 42 the application still continues with its normal operation 33*b*, and allows the user to create items, reply to received items, or to send already created items. Preferably, the second size limit is contained within the transfer control means 20 code, and is set to the required level by a mail system administrator. If the database size is less than the second size limit (43), then the application continues with its document initialization 33*b*.

In the preferred embodiment the transfer control means 20 code is included within Lotus Notes' Memo QueryOpen event, however it will be appreciated that the transfer control means may be activated by the application 10 at any time suitable for preventing sending of information items.

Figure 5:
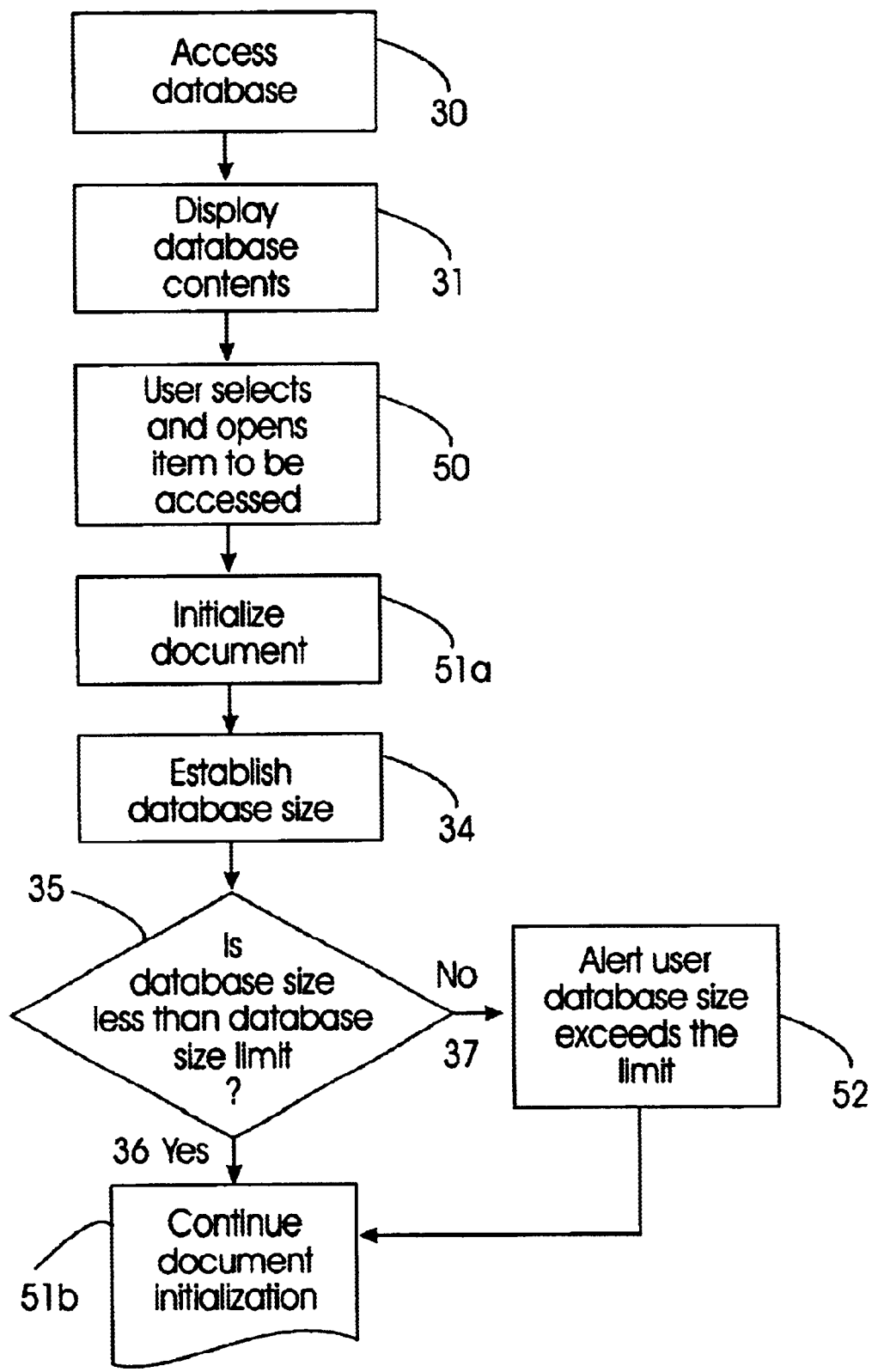
FIG. 5 is a flow diagram outlining the function of the electronic mail application and transfer control means when a user attempts to access a received item.

FIG. 5 shows the preferred operation of the an application incorporating a transfer control means when a user tries to access an information item which they have received. The transfer control means does not prevent the application from allowing a user to access a received item, but rather alerts the user when the database size has exceed the database size limit. The user first accesses the mail database 30, the contents of which are displayed 31 by the user interface 22.

Once the contents of the database have been displayed 31, the user selects and opens 50 the item that is to be accessed from those items displayed in the window. For example, the item may be an electronic mail which the user wants to read, or an executable file which the user wants to run. The application initialises the document 51*a*.

Next, the application activates the transfer control means 20. The control means 20 first checks 34 the size of the database. The means then performs a comparison 35 of the database size with the database size limit. If the database size is less 36 than the database size limit the application proceeds as normal and continues the document initialisation 51*b*. If the database size is greater 37 than the database size limit, then the transfer control means alerts the user 52 by way of a pop up window on the computer screen that the database size is over the limit. It will be appreciated that this is a preferred embodiment and that the user could be alerted by some other suitable means. The means preferably also advises the user that they should delete some of the items contained in their mailbox to enable normal operation of the application. The application then proceeds as normal and continues the document initialisation 51*b*.

Figure 6:
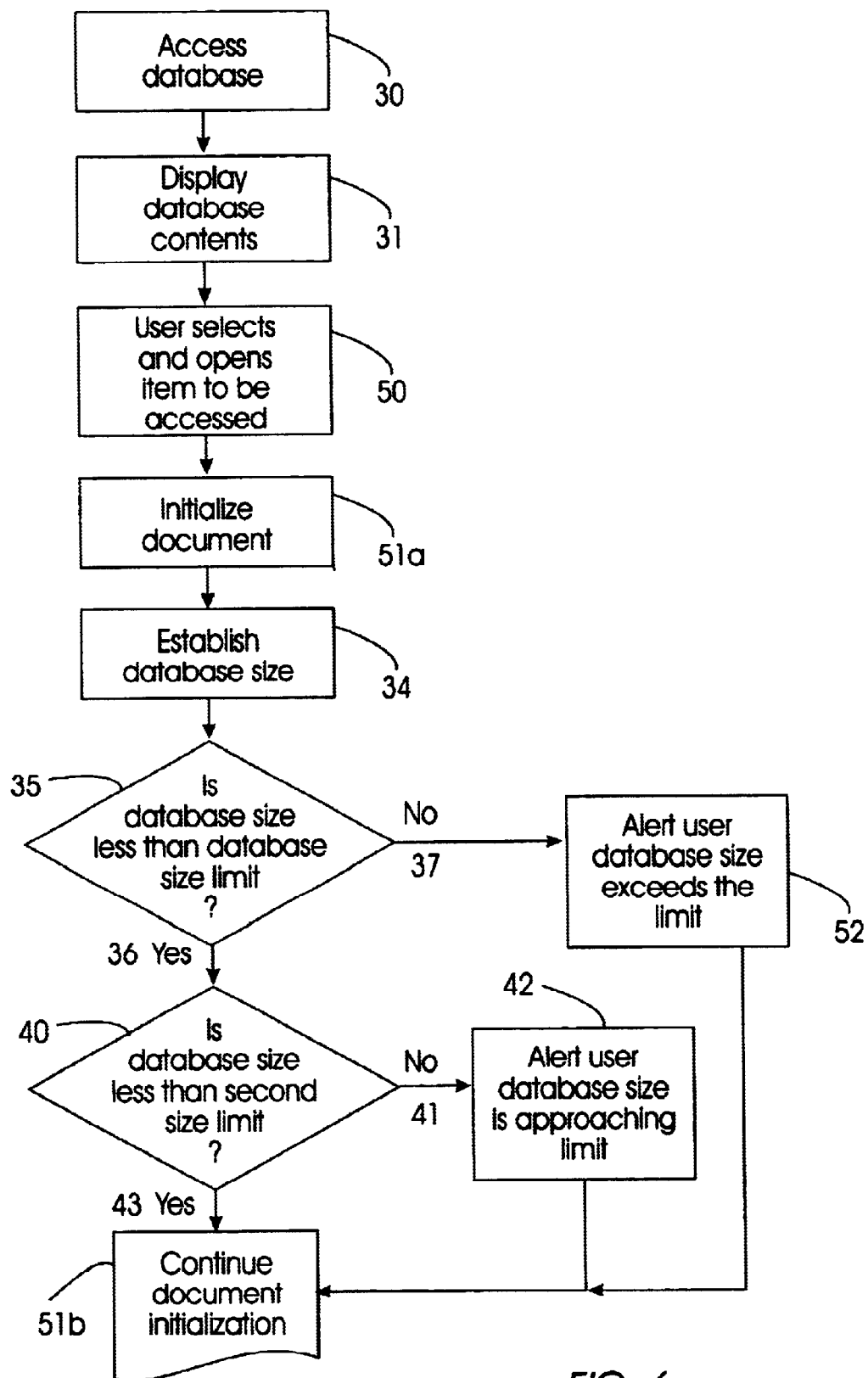
FIG. 6 is a flow diagram outlining the function of the electronic mail application and transfer control means when a user attempts to access a received item, and further including a database size warning means.

FIG. 6 shows a further embodiment, in which the transfer control means also compares 40 the database size with the second size limit. When the database size exceeds the second size limit 41 the user is alerted 42 that the database size is approaching the limit. However after alerting the user 42 the application still continues with its document initialization 51*b*, and allows the user to create items, reply to received items, or to send already created items. If the database size is less than the second size limit (43), then the application continues with its document initialization 51*b*.

It will be appreciated that activating the transfer control means when a user attempts to access an information item is a preferred embodiment of the invention, but is not a requirement.

The program code of the information transfer application including the transfer control means can be stored on a computer readable storage medium. The storage medium can be a floppy disk, CD-ROM, hard disk drive, MO disk or the like. The program code contained on the storage medium can be read by the computer using a suitable storage media reading device, and the program code can then be transferred to computer memory. Once in the computer memory the program code can be executed and, in cooperation with the computer's operating system, provide instructions to the computer's CPU to implement the information transfer application of the present invention.

The present invention also provides a method for users of information transfer applications to control the size of the electronic mail database associated with the application. By implementing an application which incorporates the transfer control means, users will be warned when the database size exceeds an allowable limit. Further the transfer control means will prevent the user from sending further information items from their computer. Preventing a user from sending items will be an inconvenience and provide the user with an incentive to delete at least some of the items from the database to reduce the database size below the allowable limit.

What is claimed is:

1. An information transfer application for enabling a user to electronically transmit items to, and electronically receive items from, a plurality of destinations, the application storing the items in a mail database, and the application including transfer control means and item creation means, wherein the control means monitors the storage space required to store the items and disables the item creation means when the required storage space of the mail database exceeds a first set level, to prevent the user from initiating further transmission of items to one or more of the destinations.

2. A transfer application according to claim 1 wherein the application includes item transmission means and the control means disables the transmission means if the required storage space exceeds the first set level.

3. A transfer application according to claim 1 further including notification means for notifying the user when the required storage space exceeds the first set level.

4. A transfer application according to claim 3 wherein the notification means further notifies the user when the required storage space exceeds a second set level which is lower than the first set level.

5. A transfer application according to claim 1 wherein the application is an electronic mail application and each item is an electronic mail or electronic mail attachment.

6. A system for electronically transmitting items to, and electronically receiving items from a plurality of destinations, the system including:

an information transfer application, the application including transfer control means and item creation means, and a mail database, wherein the application stores the items in the mail database and the control means monitors the storage space required to store the items and disables the item creation means when the required storage space of the mail database exceeds a first set level, to prevent a user from initiating further transmission of items to one or more of the destinations.

7. A system according to claim 6 wherein the information transfer application includes item transmission means and the control means disables the transmission means if the required storage space exceeds the first set level.

8. A system according to claim 6 further including notification means for notifying the user when the required storage space exceeds the first set level.

9. A system according to claim 8 wherein the notification means further notifies the user when the required storage space exceeds a second set level which is lower than the first set level.

10. A system according to claim 6 wherein the application is an electronic mail application and each item is an electronic mail or electronic mail attachment.

11. A method for controlling an information transfer application which can receive and transmit items, the application including transfer control means and item creation means, the items being stored in a mail database, the method including the steps of:

receiving a request to initiate transmission of a new item using the application, determining the storage space required to store previously received and transmitted items in the mail database, comparing the required storage space of the mail database with a first set level, and disabling the item creation means, by the transfer control means, if the required storage space of the mail database exceeds the first set level to prevent the initiation of item transmission.

12. A method according to claim 11 wherein the initiation of item transmission is prevented by disabling an item creation moms associated with the application.

13. A method according to claim 11 wherein the initiation of item transmission is prevented by disabling an item transmission means associated with the application.

14. A method according to claim 11 further including the step of alerting a user of the application when the required storage space exceeds the first set level.

15. A method according to claim 14 further including the step of alerting a user of the application when the required storage space exceeds a second set level.

16. A method according to claim 11 wherein the transfer application is an electronic mail application, and each item is an electronic mail or electronic mail attachment.

* * * * *